Figure 3:
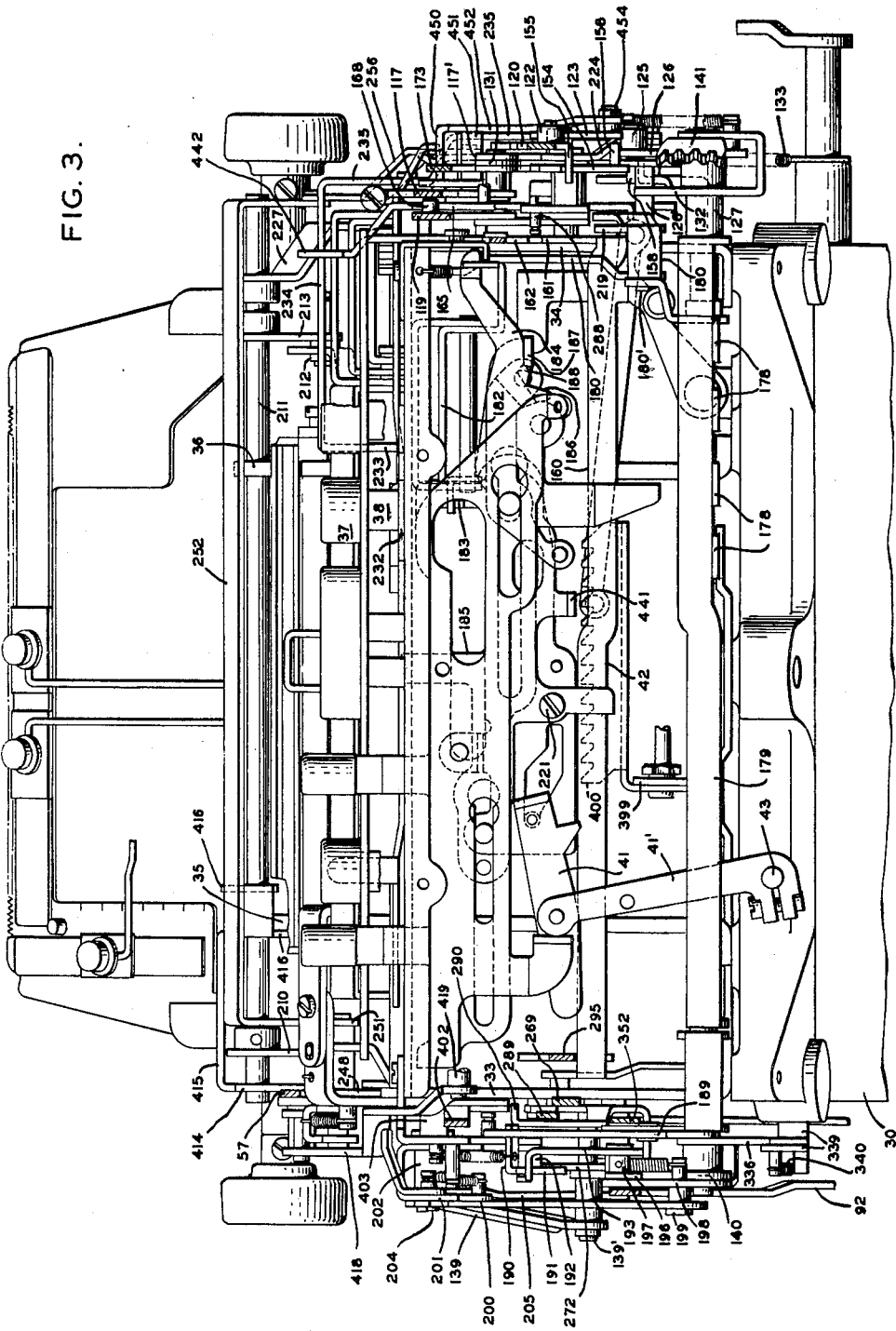

June 2, 1964   B. H. TINGLEY   3,135,463
FUGITIVE ONE CONTROL MECHANISM FOR CALCULATING MACHINES
Original Filed May 12, 1954   17 Sheets-Sheet 1
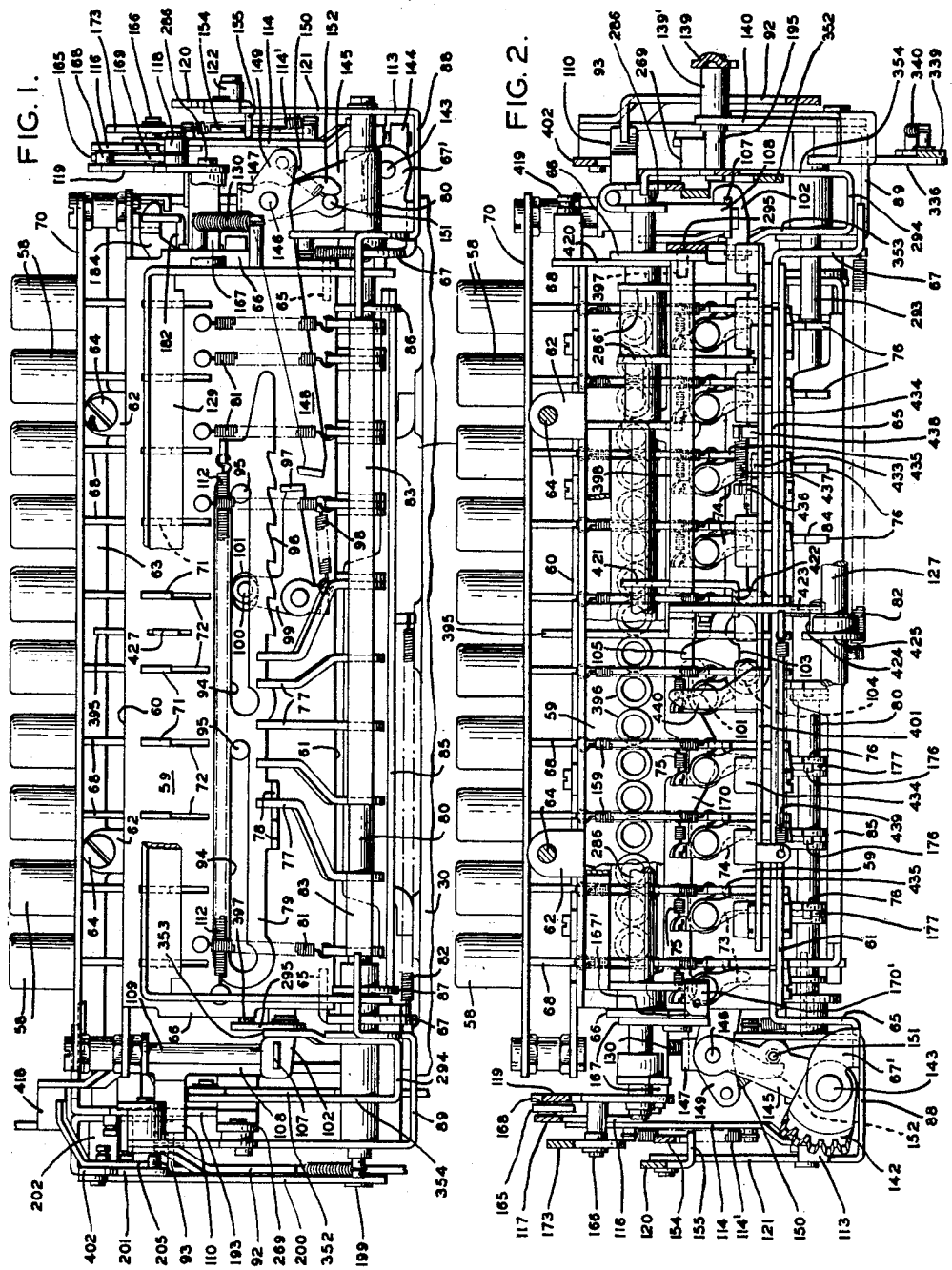

June 2, 1964     B. H. TINGLEY     3,135,463
FUGITIVE ONE CONTROL MECHANISM FOR CALCULATING MACHINES
Original Filed May 12, 1954     17 Sheets-Sheet 4

June 2, 1964 B. H. TINGLEY 3,135,463
FUGITIVE ONE CONTROL MECHANISM FOR CALCULATING MACHINES
Original Filed May 12, 1954 17 Sheets-Sheet 6

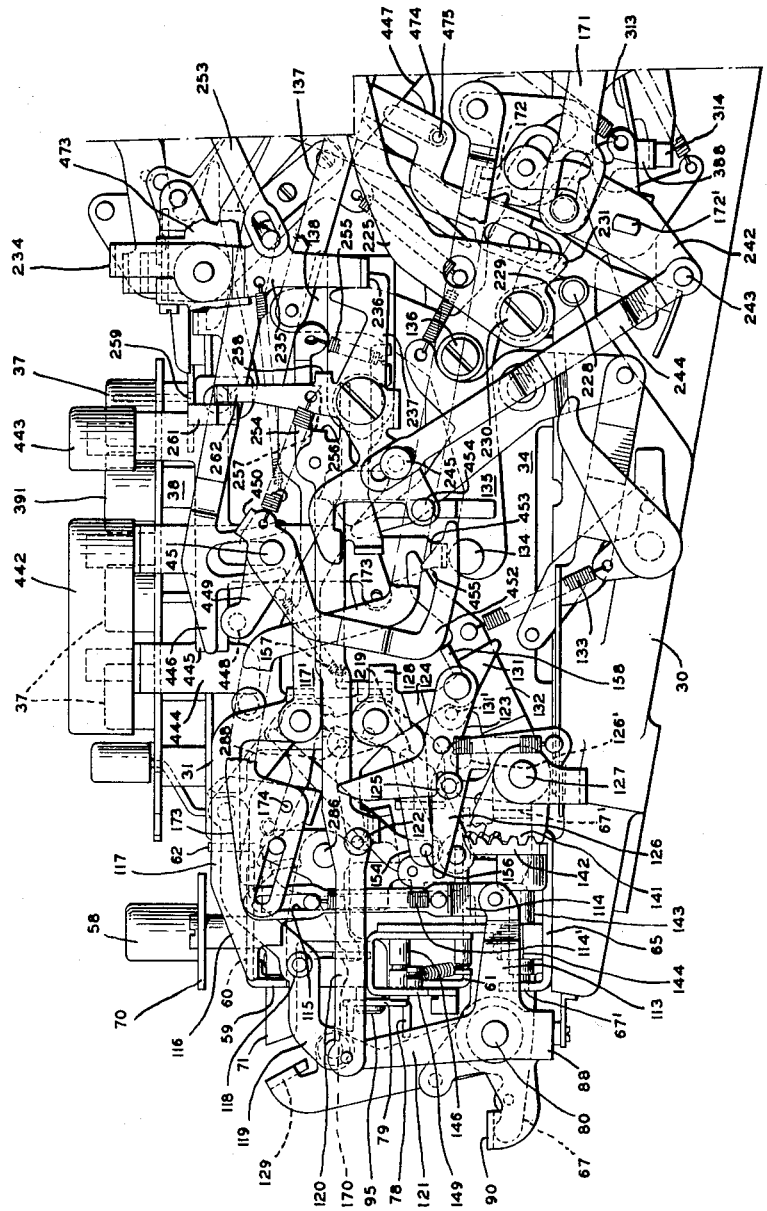

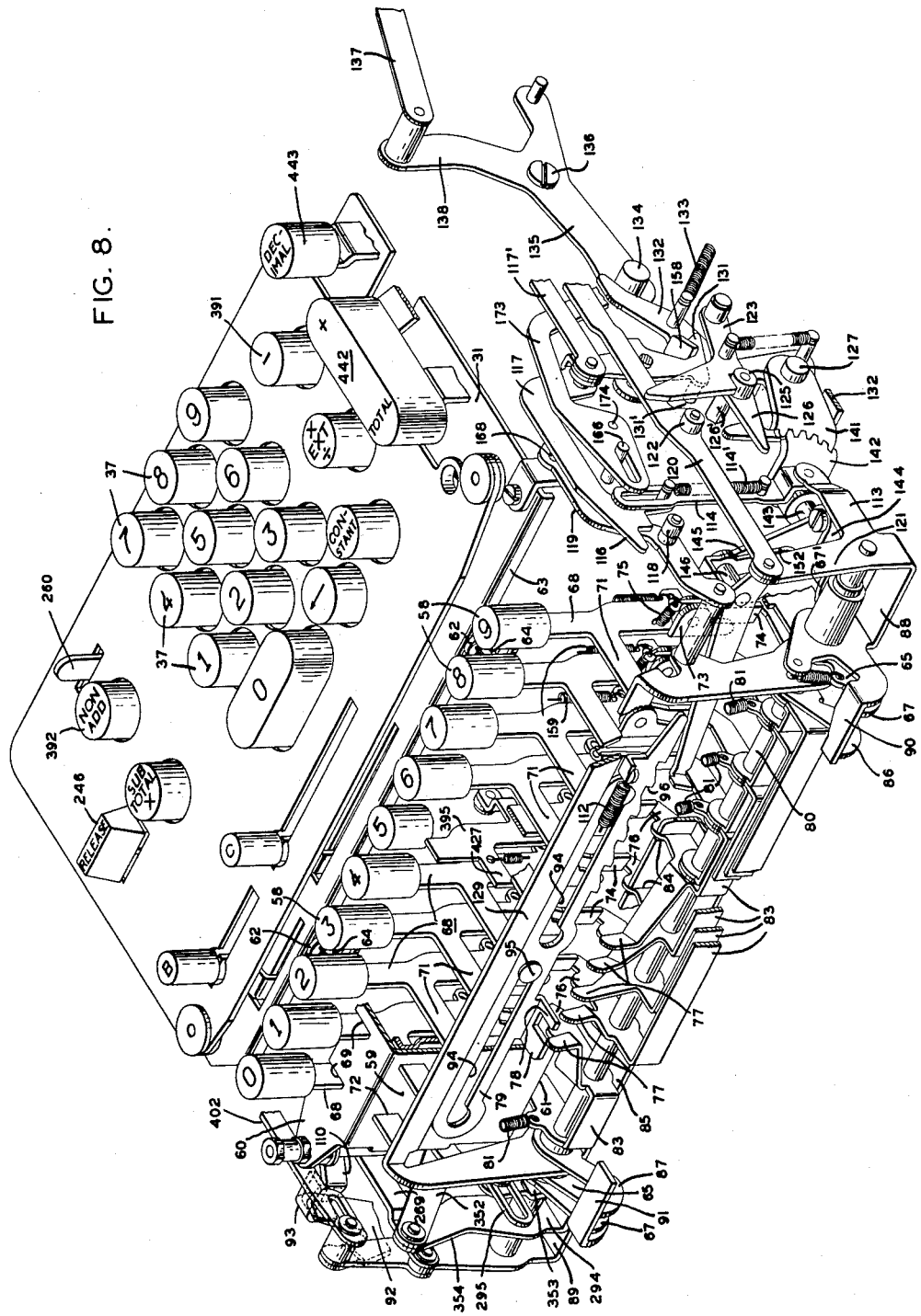

June 2, 1964  B. H. TINGLEY  3,135,463
FUGITIVE ONE CONTROL MECHANISM FOR CALCULATING MACHINES
Original Filed May 12, 1954  17 Sheets-Sheet 12

June 2, 1964   B. H. TINGLEY   3,135,463
FUGITIVE ONE CONTROL MECHANISM FOR CALCULATING MACHINES
Original Filed May 12, 1954   17 Sheets-Sheet 14

June 2, 1964
B. H. TINGLEY
3,135,463
FUGITIVE ONE CONTROL MECHANISM FOR CALCULATING MACHINES
Original Filed May 12, 1954
17 Sheets-Sheet 15
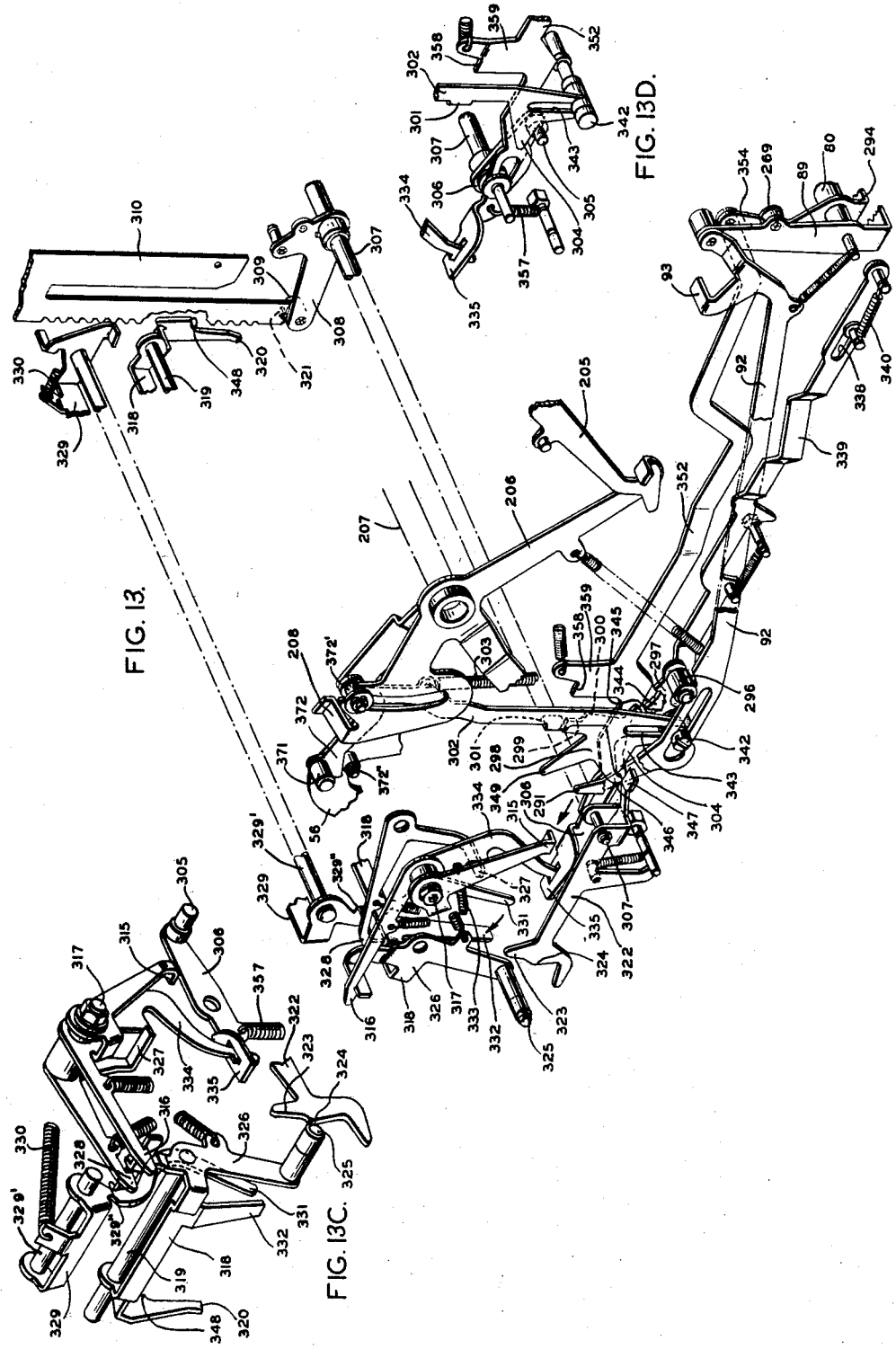

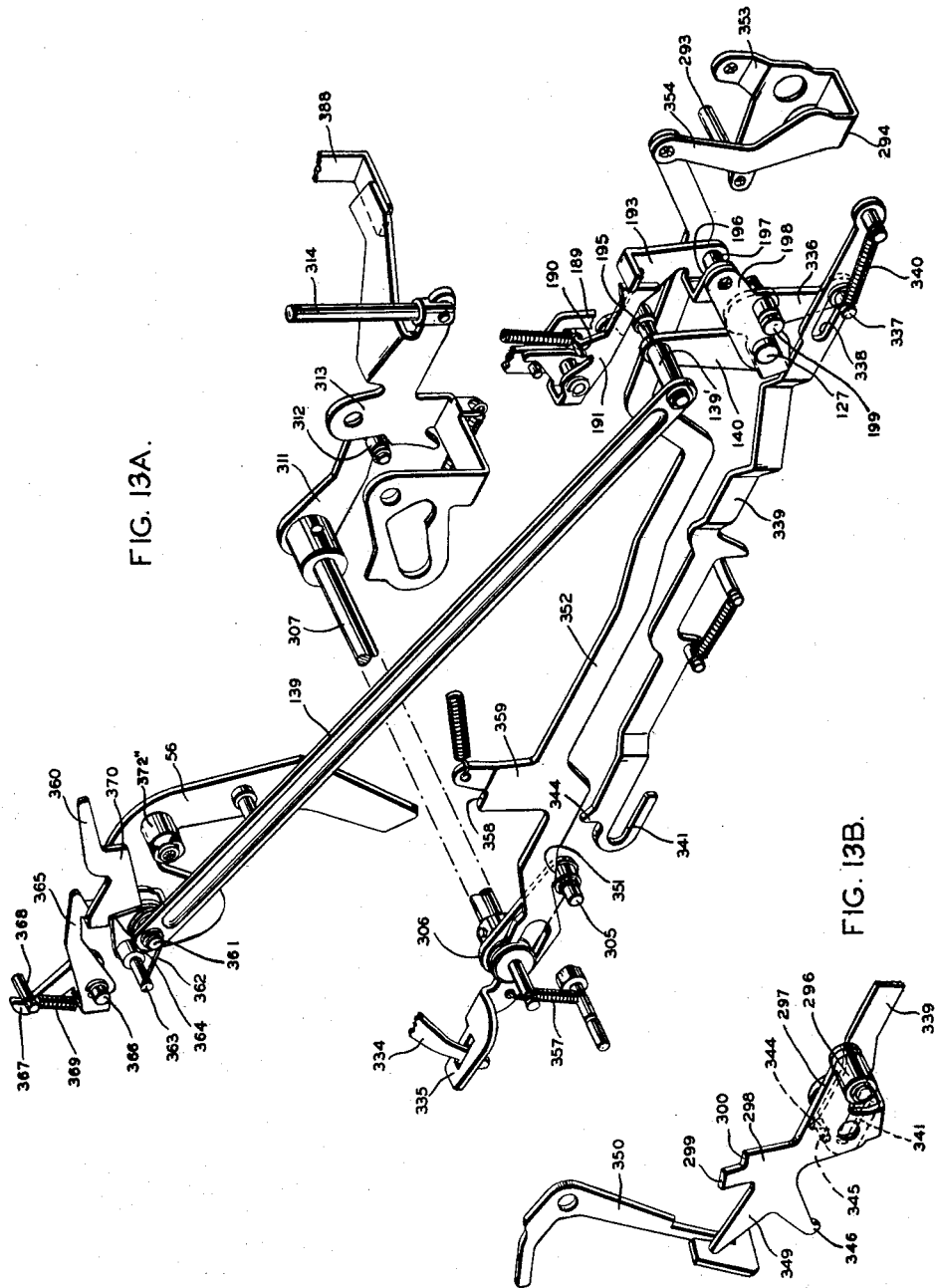

United States Patent Office 3,135,463
Patented June 2, 1964

3,135,463
FUGITIVE ONE CONTROL MECHANISM FOR
CALCULATING MACHINES
Bruce Harrison Tingley, Pine City, N.Y., assignor, by mesne assignments, to Sperry Rand Corporation, New York, N.Y., a corporation of Delaware
Application Sept. 27, 1960, Ser. No. 58,814, which is a division of application Ser. No. 429,277, May 12, 1954, now Patent No. 2,984,411, dated May 16, 1961. Divided and this application Nov. 13, 1962, Ser. No. 241,458
2 Claims. (Cl. 235—60.2)

This invention relates to new and useful improvements in fugitive one control mechanism for calculating machines and has particular reference to improvements in the ten-key key-set type of calculator; being a division of my co-pending application Serial Number 58,814, filed September 27, 1960, which application, in turn, is a division of my co-pending application Serial Number 429,277, filed May 12, 1954, now Patent No. 2,984,411, dated May 16, 1961.

The particular machine wherein this invention is embodied is an improvement over the machines disclosed in U.S. patents to Walter W. Landsiedel, 2,203,336; 2,229,980; 2,237,881; 2,255,622; 2,688,439 and 2,726,037 in his name as follows:

It is more directly an improvement over Patents Nos. 2,688,439 and 2,726,037, more especially the latter which shows a calculator adapted to perform multiplication by a short cut method.

In the Patent 2,726,037 provision was made for short cut multiplication wherein the multiplicand was entered in the usual fashion and spaced in accordance with the number of digits in the multiplier. Then a short cut key was depressed, after which the multiply lever was pushed rearwardly and held for the proper number of cycles for each digit of the multiplier. As before, the machine would cycle through a blank and total stroke and print the product. The multiplicand and the first multiplier digit were printed at the end of cycling of the first digit. Subsequent multiplier digits were printed at the end of their respective series of cycles.

To facilitate the operation a dial was provided which indicates the successive cycles, so that the multiply lever could be released at the proper time.

The parent application S.N. 429,277, now Patent No. 2,984,411, is directed to the provision of mechanism to eliminate the dial and the lever altogether, and to provide a series of multiplier keys in addition to the regular keyboard so that after the multiplicand is entered and properly spaced it is merely necessary to press the desired multiplier key corresponding to the multiplier digit being entered into the machine, and the machine will take over and automatically cycle the proper number of times and then automatically take a total and print the product. There are no dials to watch or levers to hold and release. Just press down the proper key for the successive digits to be cycled.

Application S.N. 58,814 is directed to the provision of improved mechanism for the printing of multiplier and quotient digit symbols in response to selective actuation of multiplier keys.

The present invention is directed to the provision of improved fugitive one control mechanism.

Figure 4:
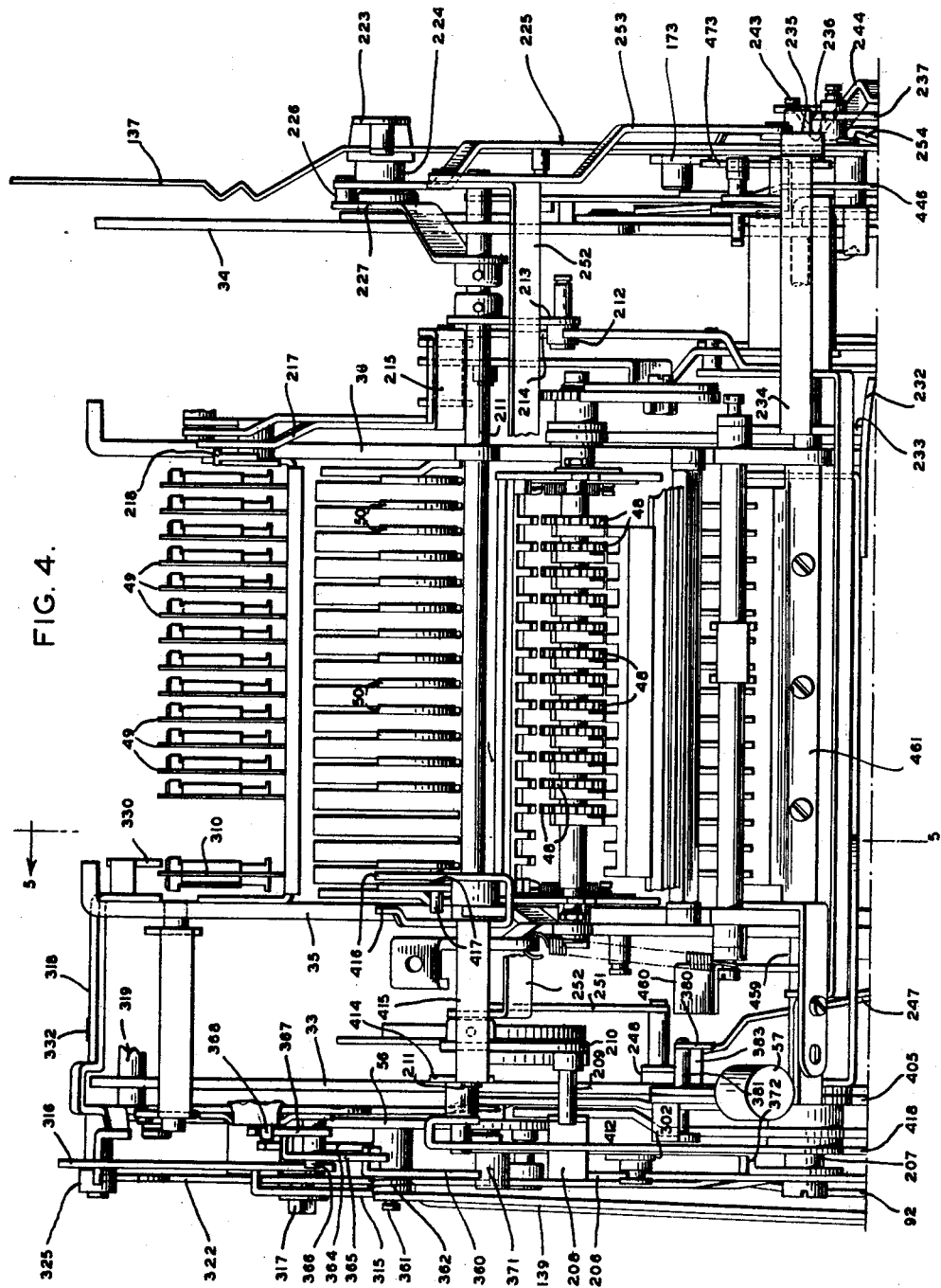
Figure 4A:
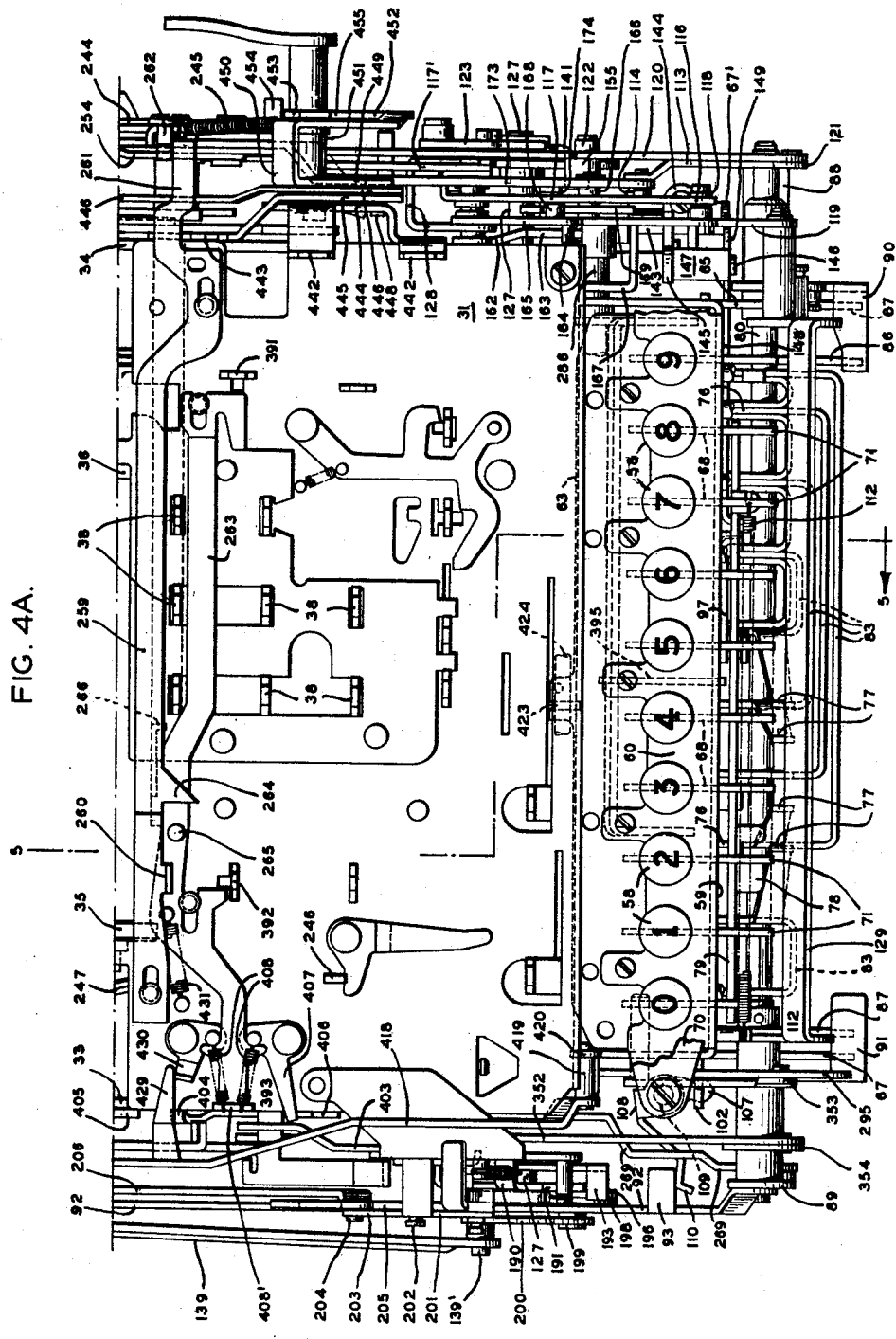
Figure 5:
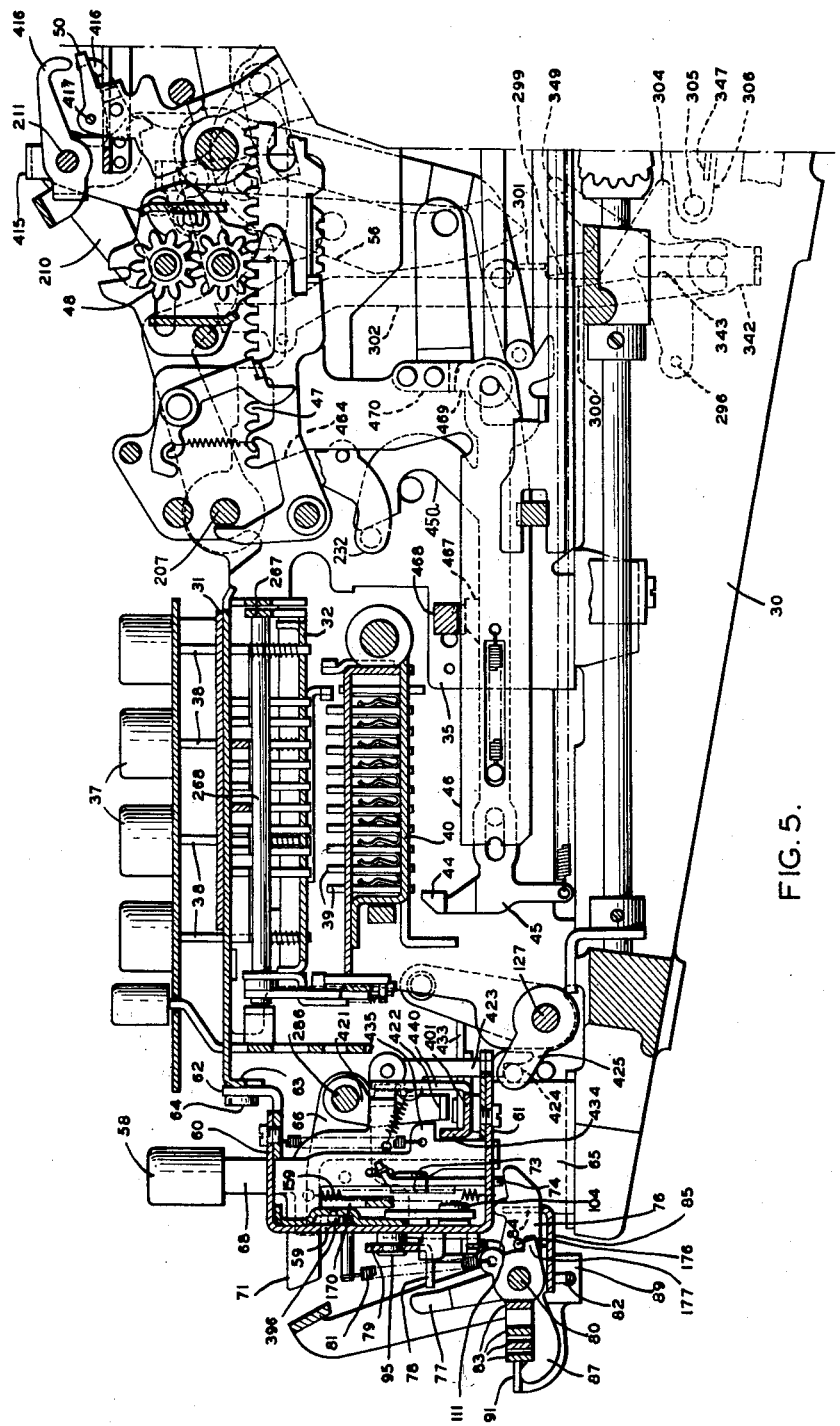
Figure 5A:
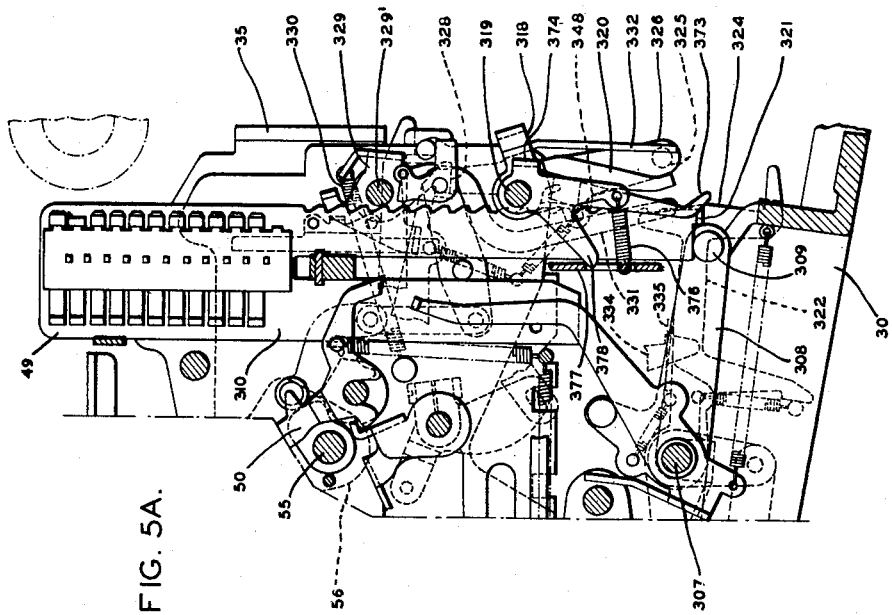
Figure 6:
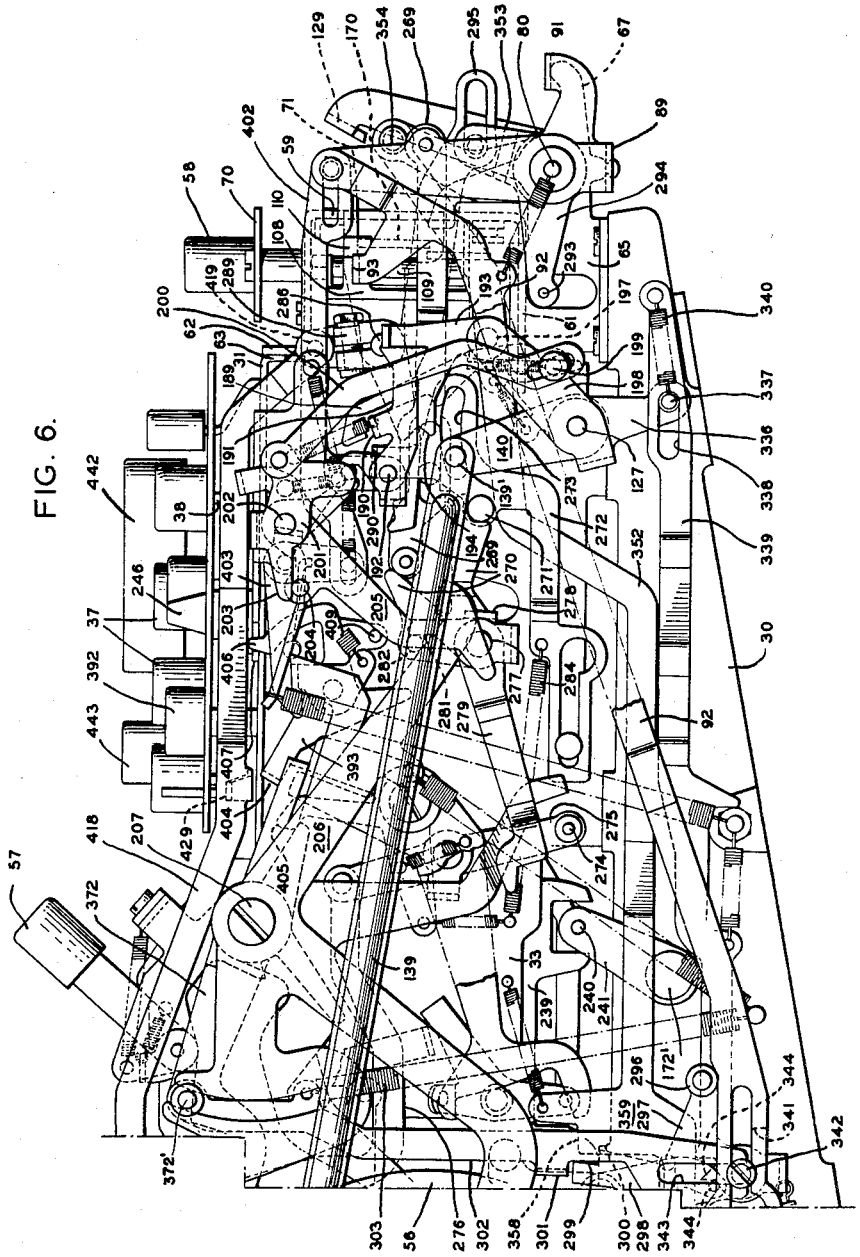
Figure 6A:
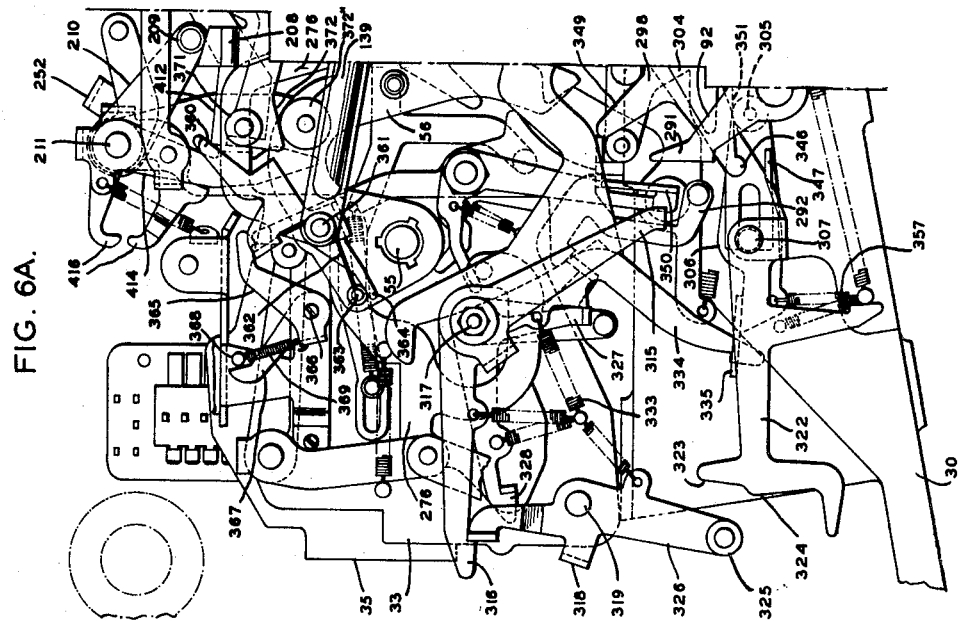
Figure 7A:
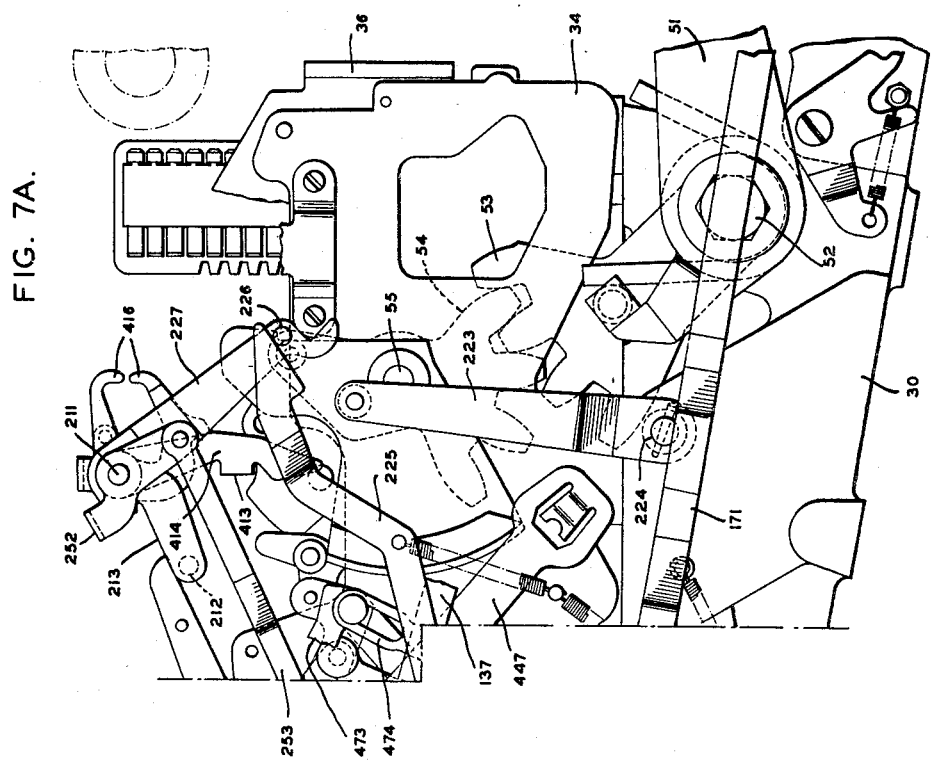
Figures 9, 9A:
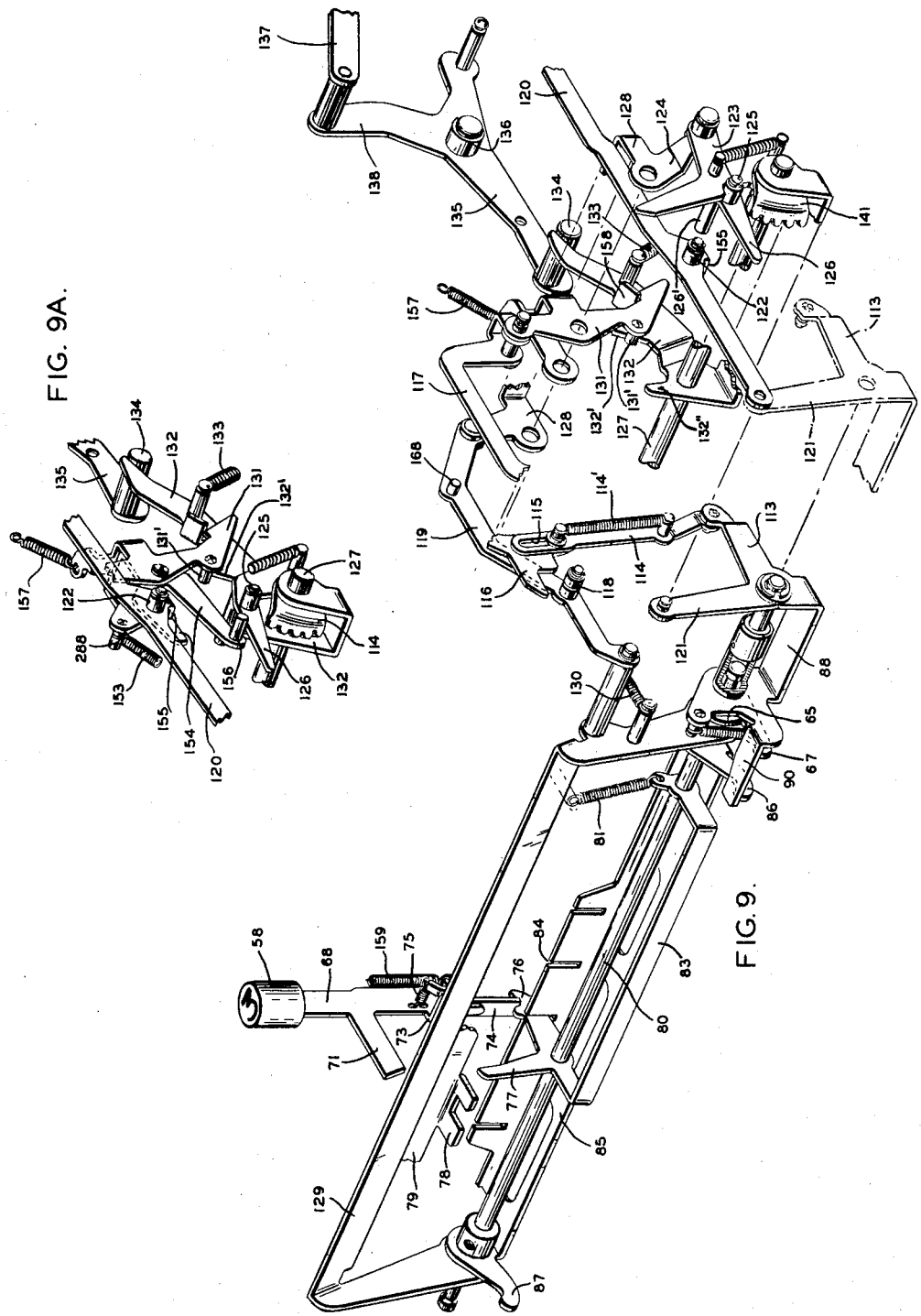
Figure 10:
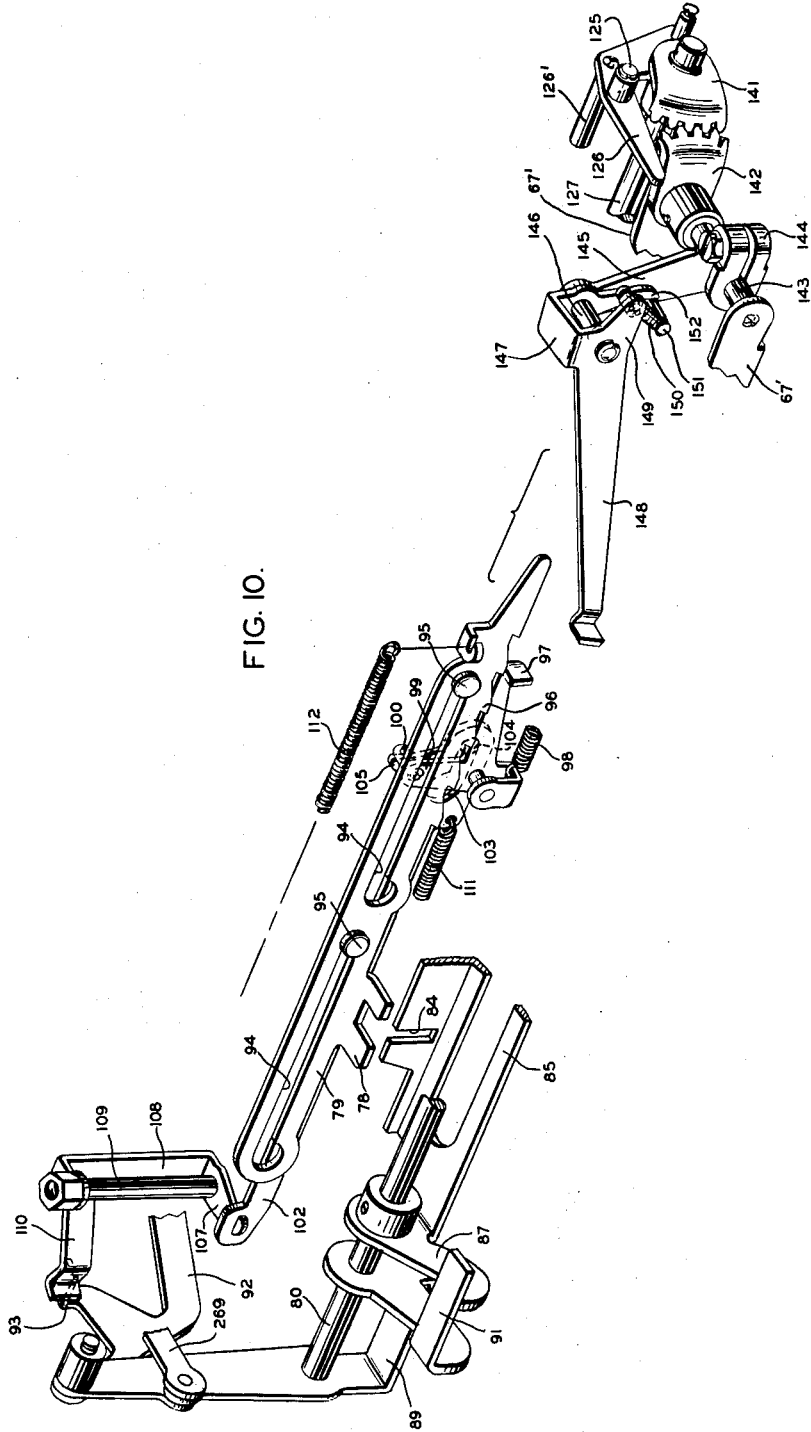
Figure 11:
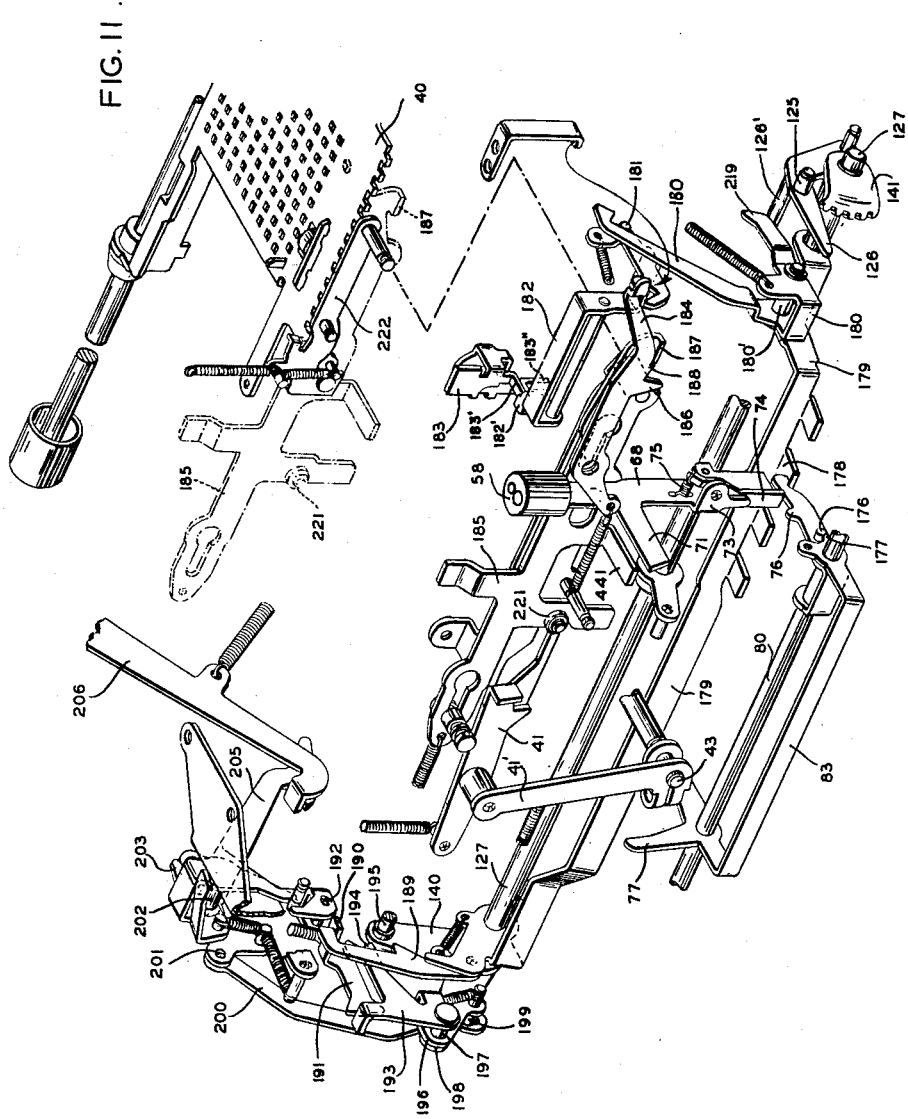
Figure 12:
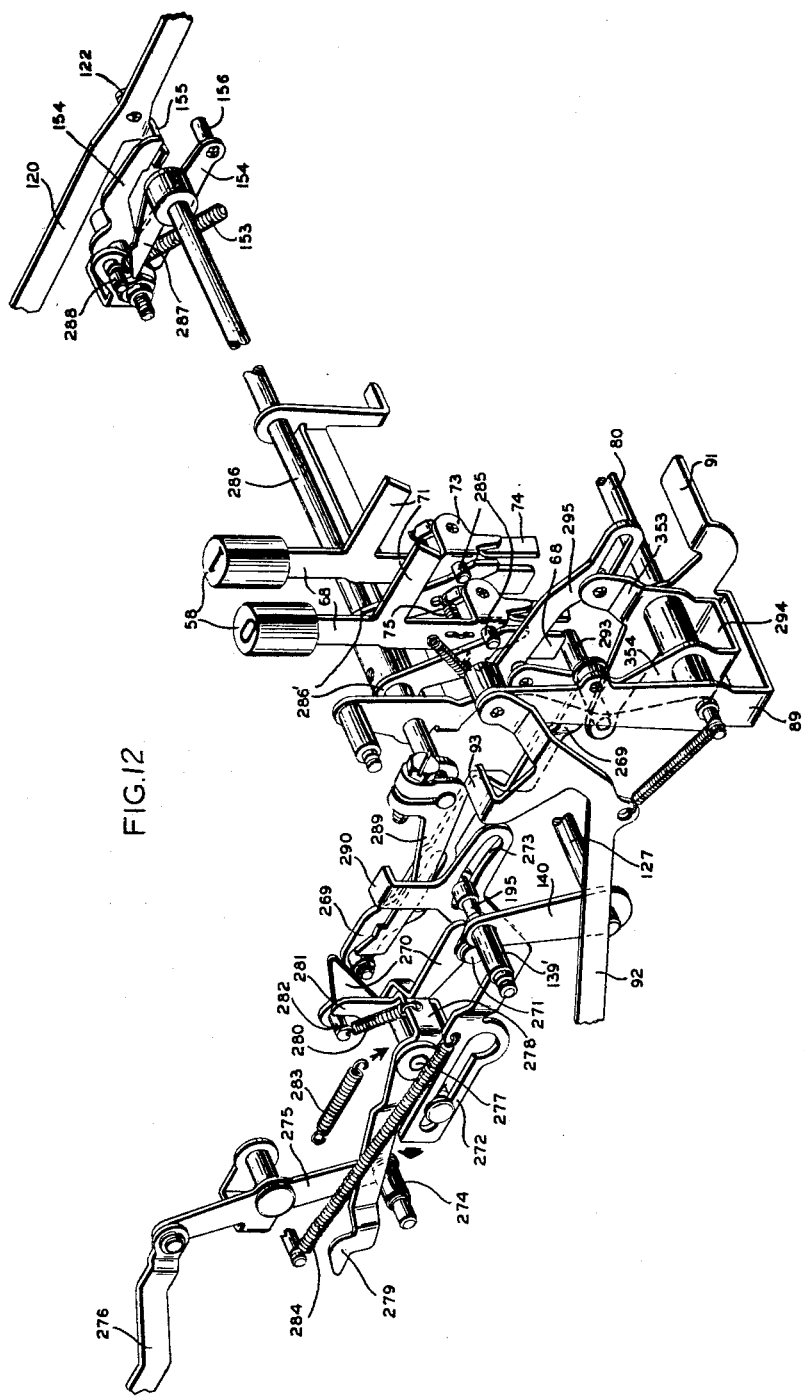
Figure 14:
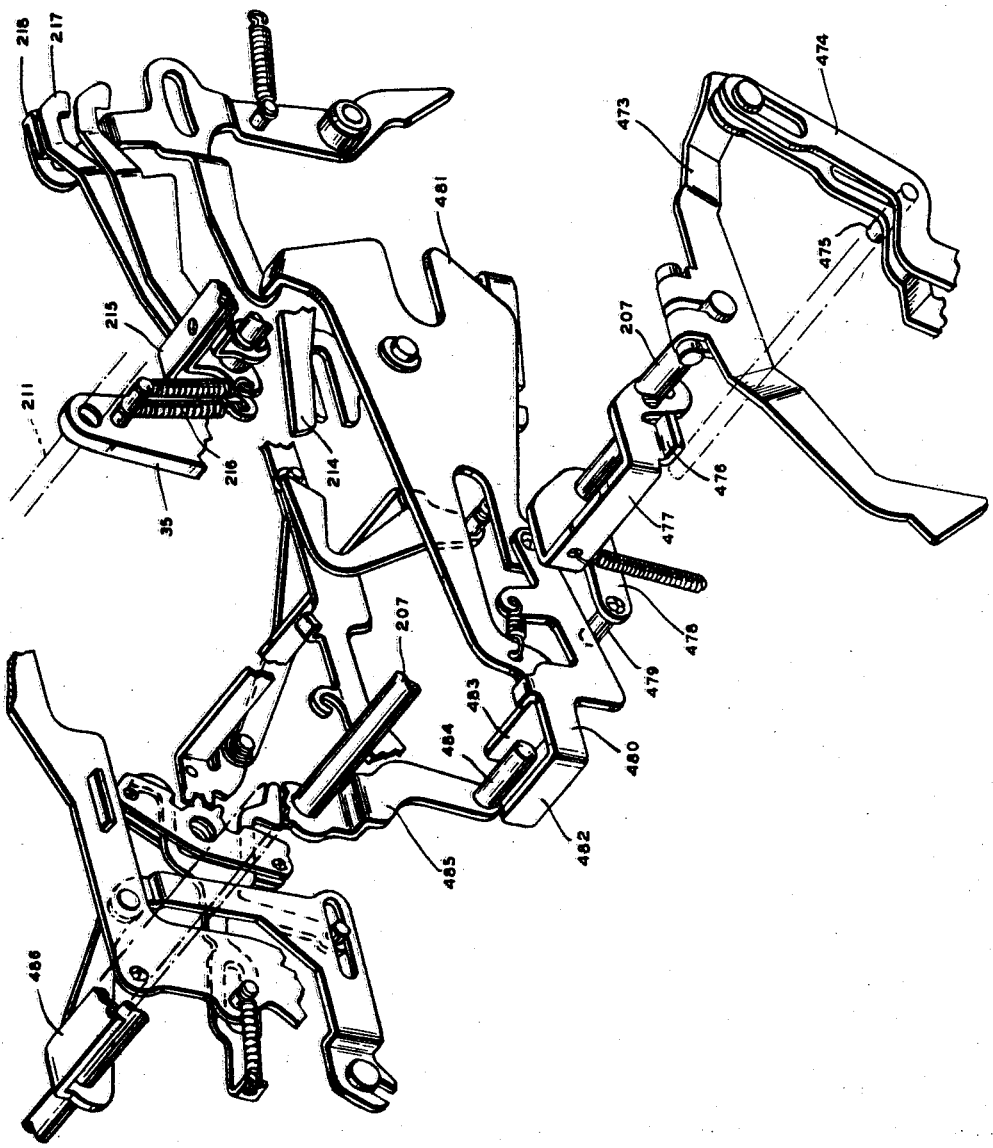

The preferred form of the invention is shown in the accompanying drawing with the cover casing removed, and in which:

FIG. 1 is a front elevation of the multiplier keyboard;
FIG. 2 is a rear elevation of the multiplier keyboard removed from the machine;
FIG. 3 is a front elevation of the machine with the multiplier keyboard removed, and with certain parts at the sides shown in section;
FIGS. 4 and 4A taken together constitute a plan view of the machine with the casing and the keyboard removed, but with the multiplier keyboard in position;
FIGS. 5 and 5A taken together constitute a vertical longitudinal section taken approximately on the line 5—5 of FIGS. 4 and 4A;
FIGS. 6 and 6A taken together constitute a left side elevation of the machine;
FIGS. 7 and 7A taken together constitute a right side elevation of the machine;
FIG. 8 is a partial perspective view of the front end of the machine showing the main keyboard and the multiplier keyboard;
FIG. 9 is a perspective view of certain parts having to do with the operation of the "two" through "five" keys with some portions of it shown in exploded relation;
FIG. 9A is a detail perspective showing some of the parts of FIG. 9 in their normal relation;
FIG. 10 is an enlarged perspective of an operating slide and associated parts;
FIG. 11 is an exploded perspective of mechanism in short cut multiplication particularly the escapement mechanism and the non-print control mechanism;
FIG. 12 is a perspective of mechanism involved when the "zero" or "one" key are depressed, with some parts exploded and some omitted;
FIG. 13 is a perspective of the mechanism for operating the quotient rack with some parts exploded;
FIG. 13A is a perspective of other parts of the mechanism of FIG. 13 with some parts exploded and some others omitted;
FIG. 13B is a perspective detail of FIG. 13 showing mechanism to backspace and step up the M and Q rack five positions;
FIG. 13C is a partial rear perspective of the latches and bails employed in connection with the blocking and holding of the M and Q rack;
FIG. 13D is a detail perspective drawn out of FIG. 13 to avoid confusion;
FIG. 14 is a perspective of means for preventing misoperation of the credit balance mechanism during division operations.

Former General Structure

The machine on which the herein improvements are imposed is of the type shown in the cited references above, especially that shown in Patent 2,726,037, and involves a base plate 30, upper and lower keyboard plates 31 and 32, outer vertical plates 33 and 34 and inner vertical plates 35 and 36 suitably braced (see FIGS. 4 and 5). The regular digit keys 37 have stems 38 which are depressed to set pins 39 on a pin carriage 40 which is escaped step by step in the usual manner by means not shown herein, but shown in FIG. 6 of Patent 2,726,037 above. The pin carriage 40 (FIG. 5) is backspaced by means of pawl 41 (FIG. 3) cooperating with backspace rack 42 in the usual manner through operation of arm 41' and backspace shaft 43. The set pins 39 are, when set, disposed in the path of lips 44 on slides 45 cooperating with adding racks 46, the teeth 47 of which, mesh with the accumulator wheels 48 (FIG. 5). These racks also mesh with pinions (not shown) to elevate the type racks 49 (FIGS. 4 and 5). The printing hammers 50 are fired generally in the manner as set forth in FIG. 1 of Patent 2,203,336. The machine is driven by an electric motor (not shown) but generally as shown in FIG. 6 of Patent 2,229,980 above, and this action oscillates bellcrank 51 (FIG. 7A) pivoted at 52 and having a gear sector 53 meshing with a similar sector 54 fixed to main shaft 55. On the opposite end of the main shaft 55 is the backspace cam 56 (FIG. 6A) described and shown as part 194 (FIG. 3 of Patent 2,726,037). There is also shown the division lever of key 57 (FIG. 6) and its associated elements which are in the main the same as in the above Patent 2,726,037 (FIG. 3 thereof). The general structure and operation of the present machine is in many respects the same as the patent above, and any changes and alterations thereof will be taken up in connection with the description of the structure and operation of the improvements which constitute this invention, and which are in one or another manner related to the regular elements.

*Structure and Operation of Improvements*

It should be recalled that in the machine of the invention, instead of pushing a multiply lever and watching a dial, it is merely necessary, after the multiplicand has been properly entered in the pin carriage, to press the proper multiplier digit key to start the machine and multiply by that digit. If that is the only multiplier digit involved in the operation, the machine will automatically proceed to take a total. Otherwise, the next digit key is depressed until the last multiplication has taken place, whereupon the machine will proceed to take and print the total. This last operation involves two cycles. When the first multiplier digit is cycled, on the last cycle of this series a multiplication cycles, the digit involved and the multiplicand are printed. Further multiplication cycles for other digits of the multiplier will involve only the printing of the multiplier digit until the printing of the total or product as above stated.

A main feature of the present invention resides in a multiplier keyboard which is attached to the front of the machine and supports a plurality of multiplier digit keys 58 representing digit values from 0 to 9. These are supported on a C-shaped frame having a vertical wall 59 (FIG. 5), top and bottom rearwardly extending walls 60 and 61. The rear of the top wall 60 is secured to an angle member having apertured ears 62 permitting the frame to be fastened by means of screws 64 to a cross bar 63 on the front of the main body of the machine. Secured to the bottom wall 61 is a member 65 having dependent L-shaped ends apertured on their base portions and screwed to the base plate 30 of the machine (FIG. 6). The opposite vertical edges of the wall 59 have rearwardly extending flange plates 66 (FIGS. 1, 2 and 5). The L-shaped members 65 have forwardly extending flanges 67 acting as journals for certain shafts and rods later mentioned.

The multiplier keys 58 have stems 68 which are guided in slots 69 (FIG. 8) in the top and bottom walls 60 and 61 of the unit frame. The enlarged heads of the keys are guided in openings (not shown) in a cross plate 70 (FIG. 2) supported above and parallel to the top wall 60 of the frame of the unit. The stems 68 have forwardly projecting fingers 71 extending through slots 72 in the front wall 59 of the C frame to prevent angular turning of the stems (FIG. 1). The lower portion of the keys stems 68 having laterally turned ears 73 (FIG. 11) to which are pivoted pawls 74 to the upper end of which are connected springs 75 fastened to the stems 68. In general the depression of a "two" to "five" key 58 (FIG. 9) will cause the pawl 74 to bear down on one arm 76 of a bell-crank, the other arm 77 of which acts as a block arm and, when a key is depressed, is disposed in the path of movement of forwardly extending spaced ears 78 of a step-by-step slide member 79. The arm 76 is positioned in a comb plate 85 which is spring urged to the right by a spring 82 (FIG. 2). When an ear 78 contacts the block arm 77, which is disposed in its path, it moves the arm 77 and the comb plate 85 which are pivotally and slidably mounted on cross rod 80, to the right, thus releasing its cooperating arm 76 from the pawl 74. The arm 76 then rocks counterclockwise (FIG. 9) under the influence of springs 81 out of contact with ears 78 and is moved to the right to normal position under the influence of spring 82 acting on comb-plate 35 (FIG. 2). After the ear 78 contacts the arm 77 and releases it, the key stem 68 does not restore until the next stroke, as will later be seen. Therefore, when the block arm 77 moves to the left (FIG. 9) the pawl 74 will yield to the left thus removing pressure from the key stem. The key stem is now free to restore when unlatched. It will be seen from FIGS. 4A and 8 that bails 83 are connected respectively between the arms 76 associated with the keys 2 and 9, the keys 3 and 8, the keys 4 and 7, the keys 0 and 1, and the keys 5 and 6. It can be perceived from FIGS. 1 and 8 that there are ten arms 76, but only five block arms 77. Therefore, it is equally obvious that the operation keys 0 and 1 will set up a common block arm; the operation of key 9 will set up the block arm associated with key 2; the operation of key 8 will set up the block arm associated with key 3; the operation of key 7 will set up the block arm associated with key 4; and the operation of key 6 will set up the block arm associated with key 5. This is for the purpose of setting up multiplication by the complementary or short cut method, as is explained in the aforementioned parent Patent No. 2,984,411.

*Mechanical Operation When Keys 2 to 5 Are Operated*

As a multiply key, such as for the digit "three" (FIGS. 9 and 9A) is depressed, the pawl 74, pivoted to the key stem 68, contacts and depresses arm 76 and causes its block arm 77 to be positioned in the path of ears 78 on slide 79. The arm 76 also lies in a slot 84 in a comb plate 85 which is also pivotally mounted on rod 80. There are five slots 84 in the comb plate 85 to receive arms 76 related to keys 1, 2, 3, 4 and 5. At its ends the comb plate has forwardly extending arms 86 and 87 which respectively are adapted to operate the motor drive control bellcrank 88 (FIG. 9) and the multiply non-print bellcrank 89 (FIG. 10) through the respective offset arms 90 and 91 as said comb is rocked by the depression of a key (FIGS. 9 and 12).

As the multiply non-print bail 89 rotates clockwise (FIG. 10) it will position the multiply mechanism operating slide 92 rearward (FIG. 10). The slide 92 has an ear 93 thereon. Slidably attached to the front wall (FIG. 1) by slots 94 and studs 95 (FIGS. 1, 8 and 10) is the key stem bellcrank operating slide 79. The right hand lower edge of slide 78 has teeth 96 engageable by the end of a latch pawl 97 pivoted on the wall 59 and normally urged into engaging relation with the teeth by a spring 98. An upright arm 99 of the pawl 97 has a stud 100 extending rearwardly through a hole 101 in wall 59. Back of wall 59 is an elongate link 102 slotted at 103 to ride on a stud 104 (FIG. 10) fastened to the back of wall 59. This link at its right end has an upright finger 105 which is adapted to engage the stud 100 to move it to the right and depress the pawl 97 against the action of spring 98 fastened at one end to pawl 97 and at the other to the front face of wall 59. One end of link 102 is slotted to receive the end of arm 107 of a bail 108 rotatable on rod 109 which is supported from upper wall 60 and cross plate 70 (FIG. 1). This bail 108 also has an extension 110 at its upper end which normally lies in front of ear 93 on link 92. When the link 92 is moved rearward the ear follows and bail 108 is turned by reason of the pull of a spring 111 (FIG. 10) fastened at one end to link 102 and at the other end to the back of wall 59. It will thus be seen that upon continued movement of link 92 to the rear, extension 110 will be rotated by spring 111 acting on slide 102, thus permitting arm 105 to follow, relieving the stud 100 of pressure from arm 105 thus allowing pawl 97 to be swung by spring 98 into place to engage the teeth of the slide 79. When the link 92 moves forward again the reverse operation takes place and the pawl 97 is disengaged and the slide 79 is snapped back to normal by the spring 112 (FIG. 1) fastened at one end to the slide and at the other to the front face of the wall 59. How the slide 79 is advanced step-by-step will now be set forth.

When the motor drive bellcrank 88 is rocked clockwise (FIGS. 9 and 9A) an arm 113 thereon moves down and pulls a link 114 having a pin and slot connection 115 with a nose 116 on the front end of a link 117. The nose 116 is connected by spring 114' to the link 114. This disposes the nose 116 in the path of a roller 118 on a link 119 whereby link 117 is moved rearwardly when the link 119 moves rearwardly. A bellcrank 88 rocks clockwise (FIG. 9) a link 120 attached to the upper end of its arm 121 is moved rearwardly and carries a roller 122 rearwardly. This roller 122 contacts a control arm 123 pivoted to the lower end of key stem release arm 124 and lifts said arm 123 from engagement with roller 125 on a gear arm 126 fastened to the universal drive shaft 127. The release of arm 124, dependent from bail 128, will permit the clockwise movement of key lock bail 129 through the action of link 119 and spring 130 fastened to a frame of the machine. This bail 129 will then move in over the extension 71 of the depressed key and hold it down until released. As link 119 moves rearward its roller 118, engaging depressed nose 116, will move link 117 rearwardly. The rear end of this link 117 is attached to the upper end of a motor control latch lever 131 which is rocked clockwise (FIG. 9) to release motor drive control arm 132 which, by spring 133, is rocked clockwise and its end presses on stud 134 on one arm of a three arm bellcrank 135 pivoted to the frame of the machine at 136, to rock this crank counterclockwise (FIG. 9) to start the motor through arm 138 and link 137 (FIG. 7). This crank 135 and link 137 are the same as crank 54 and link 45 shown in FIG. 5 of Patent 2,237,881 above, and operate to start the motor in the manner described therein.

In order to keep the latch 131 from engaging the lip 158 on the motor control arm 132 until the end of a multiplying operation and/or a total taking operation, the following operation takes place: As the gear arm 126 rotates counterclockwise (FIG. 9) the stud 126' thereon encounters the front upright extension 132" on the arm 132 and lifts this arm. As the arm 132 is lifted, a raised portion 132' on the upper edge of arm 132 encounters a stud 131' on the lower end of the latch 131 to move it to the front away from the lip 158 on the arm 132. As the arm 126 returns, the stud 126' releases the extension 132' of arm 132 and the spring 133 pulls the motor control arm downwardly, so that this arm may start another cycle of operation.

As long as the latch lever 131 is held forward by the rearward position of the link 117, the latch 131 cannot engage the lip 158 on the motor arm 132. However, when the link 117 is moved forwardly the spring 157 will move the latch member 131 rearwardly to be in a position to engage with the lip 158. However, if the mechanism has to go through further strokes the raised portion 132' on the arm 132 does move the latch back to permit the further operation. When the motor strokes are ended then the arm 132 dropping from its high position will be caught by the latch.

As the motor operates, the backspace cam 56 will turn clockwise (FIG. 13A). To this cam is connected a link 139 extending to an elongate stud 139' on an arm 140 fixed on the universal drive shaft 127. The oscillation of this drive shaft 127 will rock the bevel gear 141 on its end and this gear meshes with a similar gear 142 (FIGS. 2 and 10) fixed to a stub shaft 143 journalled between spaced laterally extending flanges 67' of the multiplier unit keyboard frame. A yoke 144 fixed to stub shaft 143 has an upright arm 145 with a lateral stud 146 on which is pivoted a bail 147 having an extended actuating pawl 148 adapted to engage the teeth 96 on the slide 79 and pull it to the right, as viewed in FIG. 10. As the stub shaft 143 rocks clockwise in FIG. 10, the arm 145 so moves and lifts the pawl 148 to engage the teeth 96. The pawl 148 has a tail piece 149 to which is connected a spring 150 the other end of which is connected to a pin 151 fixed on the arm 145. The bail 147 has a tail 152 which limits the pin 151. As the arm 145 restores to normal the pawl 148 is lowered out of engagement with the teeth 96. Thus the slide is moved one space to the right on each machine operation, in which position it will be latched by the pawl 97.

In respect to keys 2 to 9, inclusive, the ears 78 on slide 79 contact block arms 77 on the next to the last multiply stroke and releases the arm 76 from the key stem pawl 74 as above mentioned. This allows the key stem comb 85 to restore and in turn permits the non-print bellcrank 89 to restore. The bellcrank 88 is prevented from restoring at this time because a spring 153 (FIG. 9A) will pull down cyclically operated latch 154 to latch over an ear 155 on link 120 to prevent the return of the link 120. This latching is effected on every forward stroke of the main shaft since the arm 126 (FIG. 9A) moves thus downward at that time and through pin 156 permits latch 154 to drop and engage the ear 155. This prevents the motor drive control arm 132 from being latched by the motor control latch 131. Control arm 123 will also be held up by contact with roller 122 on link 120, thus remaining above roller 125 on gear arm 126 and preventing the multiply key from being unlatched by key stem latch 129.

It was stated that comb 85 was restored on the forward stroke of the next to the last multiplying cycle of the machine. At this time latch 154 is holding link 120 rearwardly, preventing it from restoring. However, on the return stroke of this cycle the gear arm 126 will rotate clockwise and lift pin 156 on latch 154 to release latch from ear 155 and allow link 120 to restore. This will restore bellcrank 88 and as it does link 114 will rise and lift nose 116 from behind roller 118, allowing spring 157 to move the motor control latch 131 to the rear to enable it to latch under lip 158 on the motor control arm 132 at the end of the following main shaft stroke. On the last forward stroke of the multiplying cycles as gear arm 126 on the universal drive shaft 127 moves downward, the control arm 123 will drop behind the roller 125 on said arm 126 and on the return stroke the roller 125 will drive the arm 123 to the rear and through arm 124 rock bail 128 counterclockwise, thus driving link 119 forward and unlatching the multiply key 58 which will tend to restore under the tension of its own spring 159 (FIG. 9). The machine will print and backspace on this stroke, as disclosed in Patent 2,726,037 above.

*Means to Prevent Mis-Operation of the Credit Balance Mechanism During Division (FIG. 14)*

The purpose of this mechanism is to render the credit balance mechanism inoperative during operations involving division. The credit balance mechanism employed in this machine is substantially the same as shown in Patent 2,203,336, above, with reference particularly to FIGS. 6 to 9, and pages 9 (second column) to 10 (second column), except for the improvements thereon now to be described. In FIG. 14 there is shown the division shaft 207 which, when operated, rocks counterclockwise and similarly rocks the drive arm 473 on its right end to lift the link 474. This link has a stud 475 which extends leftward to lie under a lip 476 on a pivoted bail 477 to rock the bail clockwise when the stud is lifted. The bail 477 has an arm 478 on which is a stud 479 normally lying under an arm 480 pivoted to the front end of the subtract slide 481. The front end of arm 480 is formed as a lateral plate 482, which, in the normal position shown is spaced parallel to and in front of a similar plate 483 connected to the front end of the subtract slide 481. In the patent above mentioned these two plates are formed integrally with the front end of the slide 481 and when the slide is moved back and forth in its usual operation, these plates contact and move a stud 484 on an arm 485 dependent from a bail 486.

When the machine is set for subtraction, as in a division operation, the subtract slide is moved rearward and the plate 482, as previously mounted, would operate the stud 484 and the bail 486 to set the parts to add a "fugitive one" when a transfer took place. This is shown in FIGS. 6 through 9 of the aforementioned Patent No. 2,203,336, wherein is provided a subtract slide 112 having two bent ears 280 embracing a stud 278 protruding from a fugitive one conditioning bail 275—276—277 in a manner similar to that of slide 481 (FIG. 22 herein) where lateral pates 482, 483 embrace stud 484 protruding from arm 485 of fugitive bail 486. However, in division operations herein, the "fugitive one" mechanism is not needed since after the over-subtraction cycle takes place there is an immediately following add-in cycle which restores the accumulators to a positive condition and prints the remainder, as explained in the above mentioned applications. In the subject arrangement lateral plate 482 (similar to bent ear 280 FIG. 6 of the aforementioned Patent No. 2,203,336) is pivotably mounted on slide 481 (instead of being fixed thereto as in Patent No. 2,203,336). Lateral plate 482, therefore, may be pivoted from a "stud engaging" position to a "non-stud engaging" position.

It is, therefore, clear that, as described above, when stud 479 engages arm 480 and pivots it clockwise relative to slide 481, plate 482 is lifted clear of stud 484 at the beginning of a division operation, is not involved. This is so, since the sliding movement of subtract slide 481 towards the right (FIG. 22) is not transmitted to stud 484, and, in turn, to bail 486, preventing the setting of the fugitive one mechanism for subtract operation. In this manner, the transmission of motion from subtract slide 481 to fugitive one bail 486 is "bypassed" by the subject control, under conditions where division shaft 207 is rotated counterclockwise, as has been previously described.

While there is above described but one embodiment of the invention, it is possible to produce still other embodiments without departure from the inventive concept above disclosed, and it is, therefore desired that only such limitations shall be imposed on the appended claims as are stated therein.

I claim:
1. A machine of the class described having fugitive one mechanism including a bail pivotably mounted for rotation from an initial unactuated condition to a first position conditioning the fugitive one mechanism for an add operation, said bail being further rotatable from said initial condition to a second position conditioning the fugitive one mechanism for a subtract operation, said bail having a depending arm, a subtract slide mounted for reciprocatory movement, said slide having two lateral plates projecting therefrom, said plates being spaced apart one from the other in embracing relationship to said depending arm, one of said plates being movable relative to said subtract slide from an arm engaging position to a non-engaging position, said slide being actuatable in a first direction to engage said arm with the other of said plates actuating said bail to said first position, said slide being further actuatable in a direction opposite to said first direction engaging said one plate with said arm of said bail actuating said bail to said second position, and means operable for actuating said movable one plate into said non-engaging position preventing actuation of said bail by movement of said subtract slide in said first direction, and in turn, preventing conditioning of said fugitive one mechanism for a subtract operation.

2. A machine of the class described having fugitive one mechanism including a first bail pivotably mounted for rotation from an initial unactuated condition to a first position conditioning the fugitive one mechanism for an add operation, said first bail being further rotatable from said initial condition to a second position conditioning the fugitive one mechanism for a subtract operation, said first bail having a depending arm, a subtract slide mounted for reciprocatory movement, said slide having two lateral plates projecting therefrom, said plates being spaced apart one from the other in embracing relationship to said depending arm, one of said plates being movable relative to said subtract slide from an arm engaging position to a non-engaging position, said slide being actuatable in a first direction to engage said arm with the other of said plates actuating said first bail to said first position, said slide being further actuatable in a direction opposite to said first direction engaging said one plate with said arm of said first bail actuating said first bail to said second position, a rotatable division shaft, a division drive arm, fixed to said division shaft, a link dependent from said drive arm, a first stud projecting from said link, a pivotably mounted second bail rotatably mounted on said division shaft, said first stud positioned for engaging said second bail, said division shaft, under conditions of being rotated in a first rotative direction actuating said link upward causing first said stud carried by said link to engage said second bail actuating such second bail in a rotative direction opposite to the direction of rotation of said division shaft, said second bail having a bail arm and a second stud protruding from said bail arm and positioned to engage said movable one plate, said one plate being pivotably mounted on said subtract slide for pivotable movement relative thereto; said second stud, under conditions where said division shaft is rotated in said first rotative direction, actuating said movable one plate into said non-engaging position preventing engagement with said arm and actuation of said first bail by movement of said subtract slide in said opposite direction.

References Cited in the file of this patent
UNITED STATES PATENTS

| | | |
|---|---|---|
| 2,203,336 | Landsiedel | June 4, 1940 |
| 2,695,134 | Sundstrand | Nov. 23, 1954 |
| 2,745,601 | Fowler | May 15, 1956 |